United States Patent
Stenquist

(10) Patent No.: US 7,331,570 B2
(45) Date of Patent: Feb. 19, 2008

(54) LOW IMPACT GAS SPRING

(75) Inventor: Sven Stenquist, Bodafors (SE)

(73) Assignee: Diebolt International, Inc., Plymouth, MI (US)

( * ) Notice: Subject to any disclaimer, the term of this patent is extended or adjusted under 35 U.S.C. 154(b) by 49 days.

(21) Appl. No.: 10/918,030

(22) Filed: Aug. 13, 2004

(65) Prior Publication Data
US 2006/0033248 A1   Feb. 16, 2006

(51) Int. Cl.
*F16F 9/36* (2006.01)
*F16F 9/14* (2006.01)

(52) U.S. Cl. .............. 267/64.15; 267/64.11; 188/322.15; 188/322.17

(58) Field of Classification Search ............ 267/64.11, 267/64.15, 64.28; 188/322.15, 322.16, 322.17, 188/322.18
See application file for complete search history.

(56) References Cited

U.S. PATENT DOCUMENTS

| | | | |
|---|---|---|---|
| 1,599,573 A | 9/1926 | McElroy | |
| 2,819,064 A * | 1/1958 | Peras | 267/64.15 |
| 6,382,373 B1 * | 5/2002 | Lemmens et al. | 188/322.17 |
| 6,491,143 B1 | 12/2002 | Stenquist | |

FOREIGN PATENT DOCUMENTS

| | | |
|---|---|---|
| EP | 1113185 A | 7/2001 |
| GB | 197225 A | 5/1923 |
| WO | WO 95/27157 A | 10/1995 |

* cited by examiner

*Primary Examiner*—Melody M. Burch
(74) *Attorney, Agent, or Firm*—Reising, Ethington, Barnes, Kisselle, P.C.

(57) ABSTRACT

A gas spring with a piston rod assembly received for movement between retracted and extended positions in a casing defining a main gas chamber. The piston rod assembly when in its extended position cooperates with a portion of its retainer and the casing to at least in part provide a secondary gas chamber separate from the main gas chamber and having gas trapped therein at a higher pressure than that of gas in the main gas chamber to reduce the force required to initially move the piston rod assembly from its fully extended position toward its retracted position.

21 Claims, 4 Drawing Sheets

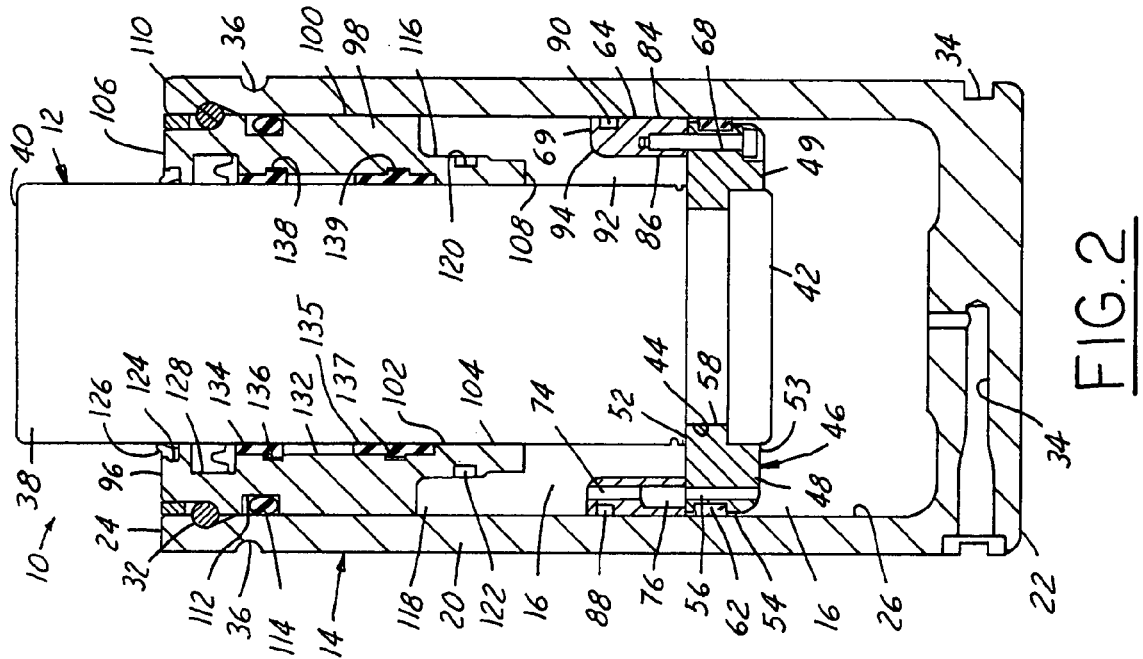
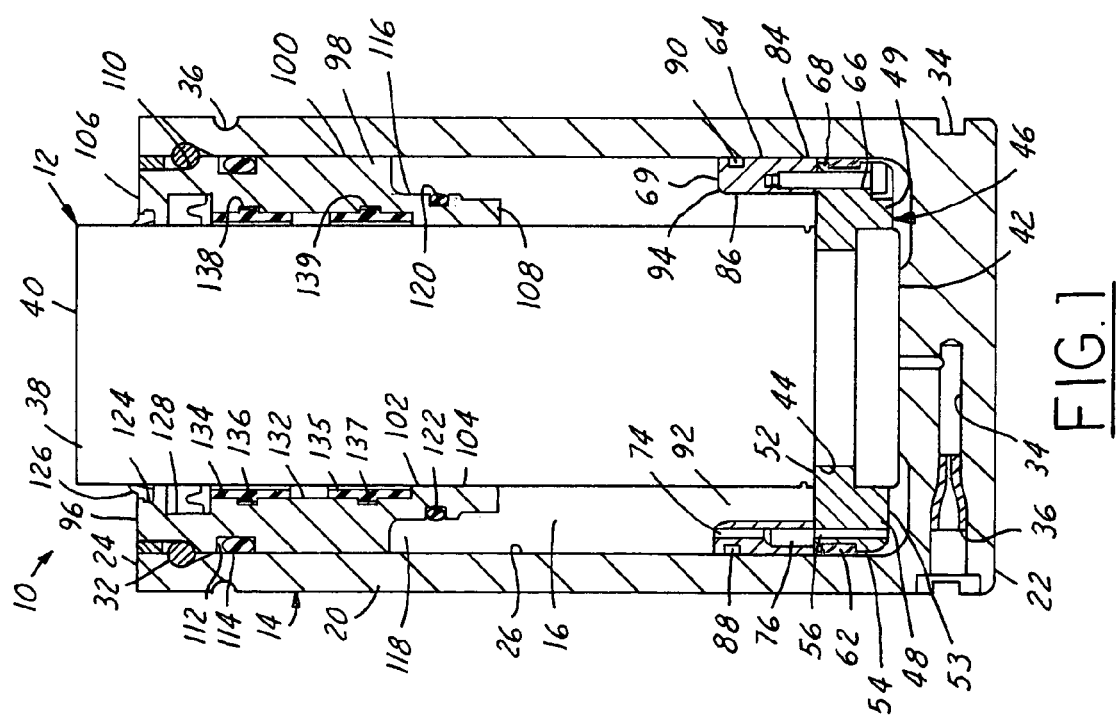

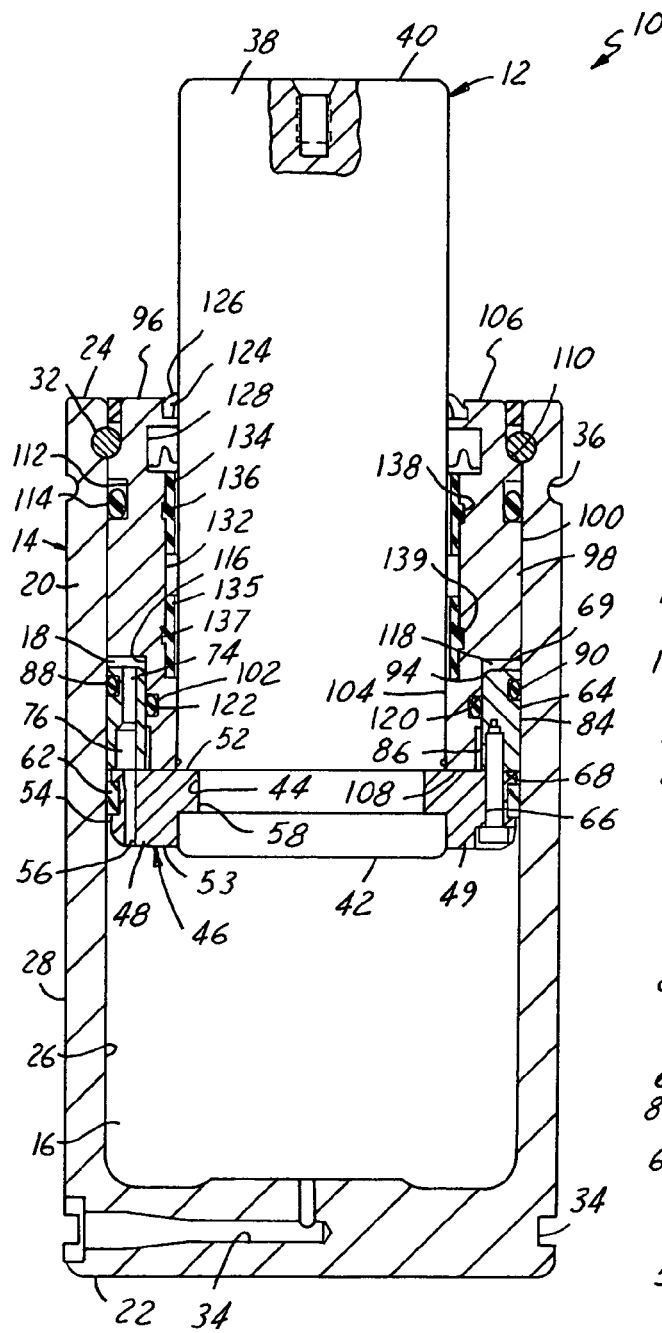
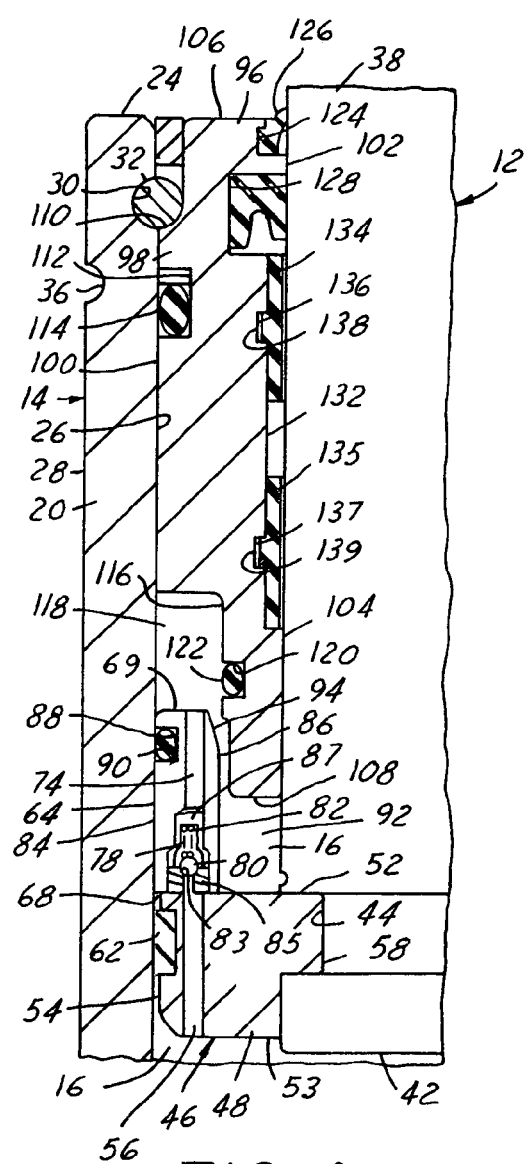
FIG. 3
FIG. 4

LOW IMPACT GAS SPRING

FIELD OF THE INVENTION

This invention relates generally to gas springs, and more particularly to a gas spring constructed to reduce the net force across a piston rod assembly of the gas spring during at least a portion of a stroke of the piston rod assembly.

BACKGROUND OF THE INVENTION

Gas springs are well known and have been used in dies of presses for sheet metal stamping operations. Conventional gas springs have a gas chamber which receives a pressurized gas that provides a force on a piston and a piston rod of the gas spring to bias them to an extended position. The pressurized gas resists the movement of the piston and the piston rod from their extended position to a retracted position. Various retainers and seals are provided in the gas spring to retain the piston and piston rod within a casing of the gas spring and to prevent leakage of the pressurized gas from the gas chamber.

Typically, a plurality of gas springs yieldably urge a binder ring or clamp ring of the die assembly into engagement with a sheet metal work piece as the dies are closed by the press to cold form the work piece. In presses with mechanical drive mechanisms, the mechanical advantage of the mechanism varies depending on the position of a ram of the press, with the mechanical advantage typically increasing dramatically as the ram approaches a fully advanced or extended position to completely close the dies and form the work piece.

When the ram of the press is in its mid-stroke position, the piston and rod of the gas spring are typically in their fully extended position. The piston and rod are initially moved toward their retracted position well before the ram reaches it fully extended position. Consequently, the gas springs initially apply a relatively large force or load to the drive mechanism of the press relative to the force the press can then produce. In addition, since the mechanical drive mechanism of the press has already begun moving and accelerating the ram and the die half attached thereto before it begins to actuate and overcome the resistance produced by the gas springs, the initial impact or actuation of the gas springs creates an impulse or load spike of relatively high magnitude and short duration on the drive mechanism of the press. The load spikes can cause an increase in the necessary press maintenance, thereby increasing the maintenance and repair costs of the press. In some instances, the spike loads may seriously damage the drive mechanism of the press, thereby decreasing the useful life of the press.

Similarly, during opening of the closed dies after a work piece has been formed, the gas springs apply a relatively high force or load to the drive mechanism of the press, which force is suddenly terminated when the piston rods become fully extended. As such, the drive mechanism is subjected to further impulse or load spikes. As mentioned above, the load spikes can result in damage to the press, for example, by causing vibration, or by causing the binder ring to bounce relative to mating components.

SUMMARY OF THE INVENTION

A gas spring incorporated in a machine, such as a press, for example, operates at reduced temperatures and provides a smooth and generally gradual load distribution between interrelated parts of the press, in use. The gas spring has a main gas chamber and a secondary gas chamber communicating with one another, at least in part, over the course of a complete stroke of the gas spring between its extended and retracted positions. The gas spring has a casing with a generally cylindrical wall defining at least in part the main gas chamber. A retainer having a generally cylindrical wall is received at least in part in the casing. The wall of the retainer has a through bore sized to at least partially receive a piston rod assembly as the piston rod assembly moves between retracted and extended positions. The retainer has an outer surface maintained generally adjacent the casing, and a necked down portion presenting a surface spaced from the casing. The surface spaced from the casing defines at least in part the secondary gas chamber separate from the main gas chamber during at least a portion of the stroke of the piston rod assembly between its extended and retracted positions.

In at least one presently preferred gas spring construction the secondary gas chamber is defined at least in part by the wall of the casing so that as the piston rod assembly cycles between its extended and retracted positions, heat produced by compressing gas in at least the secondary gas chamber is able to readily transfer through the wall of the casing. As such, the overall temperature of the gas spring is controlled, thereby reducing or controlling the operating temperatures of the gas spring components, and extending their respective useful lives and that of the gas spring.

Objects, features and advantages of this invention include providing a gas spring that requires a reduced force to initially displace a piston rod assembly from its extended position, reduces the velocity of the piston rod assembly as it moves toward its extended position, reduces the impact force on a press when the press initially engages the gas spring, extends the useful life of the press and gas spring, reduces the noise of the press and the gas spring in use, reduces vibration and misalignment of work pieces formed by the press, reduces the wear and extends the life of seals within the gas spring, reduces the operating temperature of the gas spring, increases the amount of space for bearings within the gas spring, can be retrofitted to a conventional piston rod and cylinder of a gas spring, is easy to service and repair, is durable, reliable, of relatively simple design and economical manufacture and assembly and has a long useful life in use.

BRIEF DESCRIPTION OF THE DRAWINGS

These and other objects, features and advantages of this invention will become apparent from the following detailed description of the preferred embodiments and best mode, appended claims and accompanying drawings, in which:

FIG. 1 is a full sectional view of a presently preferred embodiment of a gas spring with a piston rod assembly shown in a retracted position;

FIG. 2 is a view similar to FIG. 1 showing the piston rod assembly in a mid-stroke position;

FIG. 3 is a view similar to FIG. 1 showing the piston rod assembly in an extended position;

FIG. 4 is an enlarged fragmentary view of the gas spring of FIG. 1 in a mid-stroke position;

DETAILED DESCRIPTION OF THE PREFERRED EMBODIMENTS

Figure 5:
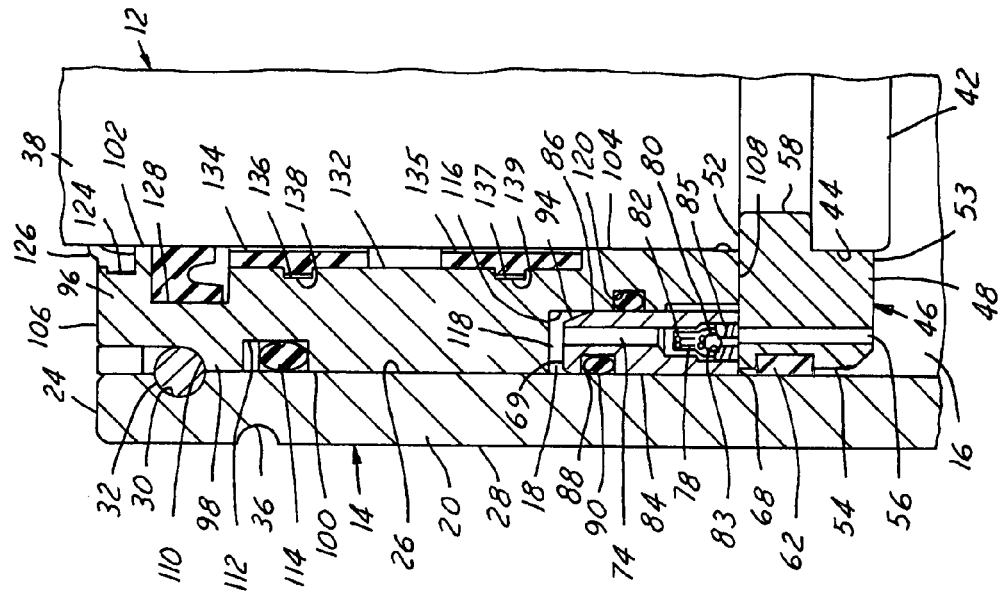
FIG. 5 is a view similar to FIG. 4 with the piston rod assembly moved to a position establishing a secondary gas chamber within the gas spring.

Referring in more detail to the drawings, FIGS. 1-3 illustrate one presently preferred embodiment of a gas spring 10 that includes a piston rod assembly 12 received within a generally cylindrical casing 14 for reciprocation between a retracted position (FIG. 1) and an extended position (FIG. 3). A main gas chamber 16 is defined at least in part between the casing 14 and the piston rod assembly 12 for receiving a pressurized gas therein. During at least a portion of a stroke of the piston rod assembly 12, a secondary gas chamber 18 (FIGS. 3, 5 and 6) is established at least in part between the piston rod assembly 12 and the casing 14. As the piston rod assembly 12 makes a complete stroke from the retracted position, to the extended position, and back to the retracted position, the main gas chamber 16 and the secondary gas chamber 18 cooperatively communicate to provide an optimal force and pressure differential across the piston rod assembly 12 to produce a relatively smooth force distribution across the piston rod assembly 12 over the stroke of the piston rod assembly 12. Accordingly, the gas spring 10 can be used, for example, within a mechanical press (not shown) to provide smooth operation of the press, and to minimize the force required to initiate and maintain movement of the piston rod assembly 12 over the course of a complete stroke of the piston rod assembly 12. As such, minimal vibration and noise are generated by the gas spring 10 and press in operation, thereby enhancing the ability to produce a uniform part in a die assembly (not shown) of the press.

Generally, a plurality of gas springs 10 may be disposed in the mechanical press such that the piston rod assembly 12 of each gas spring 10 is actuated by a ram of the press as it advances to form a sheet metal blank in the die assembly of the press. The press may be an eccentric, crank or toggle type mechanical press, for example. Desirably, the force applied to the press ram upon initially moving the piston rod assembly 12 from its extended position toward its retracted position, and also when the press ram is disengaging the piston rod assembly 12 on a return stroke, is reduced. The reduced force on the press ram results, at least in part, from the compression of gas in the secondary gas chamber 18, thereby producing a force in opposition to the force of the gas in the main gas chamber 16.

The casing 14 of the gas spring 10 has a generally cylindrical wall 20 closed at one end by a cap 22 and substantially open at the other end 24 for receiving the piston rod assembly 12 therein. Generally, the cap 22 is attached and sealed, for example by a weld joint, or formed as one piece with the cylindrical wall 20. The wall 20 of the casing 14 has an inner surface 26 defining at least in part the main gas chamber 16, and an outer surface 28. The inner surface 26 of the wall 20 has a generally circumferential retainer groove 30 (best shown in FIGS. 4-6) constructed for receipt of a snap ring 32 to maintain the gas spring 10 in its assembled state, as discussed in more detail hereafter. To facilitate mounting and locating the gas spring 10 within the press, a pair of longitudinally spaced circumferential grooves 34, 36 are formed in the outer surface 28 of the casing 14 adjacent opposite ends of the casing.

To admit gas into the gas spring 10, the casing 14 has a passage or fill port 34 extending between the inner and outer surfaces 26, 28 of the wall 20, shown here as extending through the generally closed end cap 22 of the casing 14. A fill valve 36 received in the fill port 34 acts as a one way valve that allows gas to be admitted into the gas spring 10, while preventing the gas from exiting the gas spring 10 via the fill port 34. It should be recognized that an operator may intentionally depress the fill valve 36 to release at least a portion of the pressurized gas from within the gas spring 10, if desired.

The piston rod assembly 12 has a generally elongate piston rod 38 with one end 40 extending out of the casing and adapted to engage the ram of the press, and another end 42 received within the casing 14. The piston rod 38 has a generally circumferential groove 44 adjacent to the end 42 that is constructed to receive an enlarged piston head, referred to hereafter as a retaining piston 46 (FIG. 9) having split halves 48, 49 for conjoint movement with the piston rod 38. Generally, a space or gap 50 (FIG. 9) is defined between the retaining piston halves 48, 49, and gas may flow therethrough in use.

Figure 9:
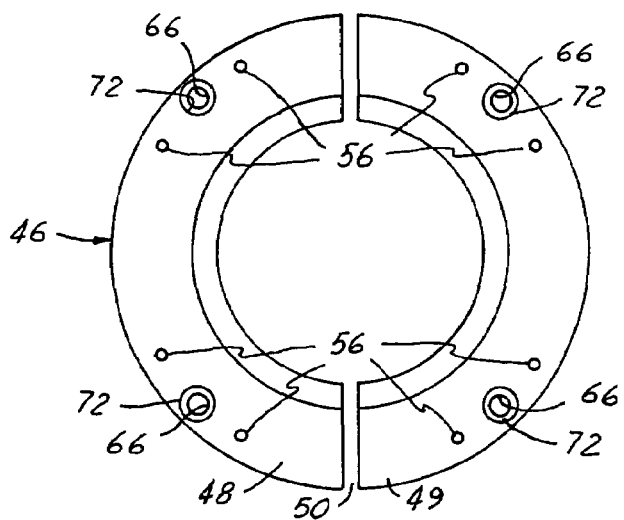
FIG. 9 is an end view of a retainer piston showing split halves of the retainer piston.

Still referring to FIG. 9, the retaining piston 46, when assembled to the piston rod 38, is generally annular and preferably has a pair of generally opposite flat faces 52, 53 extending radially outward from the piston rod 38 and terminating at a peripheral surface 54 extending generally between the faces 52, 53. A plurality of gas ports 56 extend between the faces 52, 53 of the retaining piston 46. The gas ports 56 provide, at least in part, for gas flow between the main gas chamber 16 and the secondary gas chamber 18 during a portion of the piston rod assembly 12 movement between its extended and retracted positions. Further, each half 48, 49 of the retaining piston 46 has a generally semi-circular and inwardly extending shoulder 58 constructed to be closely received within the groove 44 of the piston rod 38 to retain the respective halves 48, 49 of the retaining piston 46 on the piston rod 38 in use. To facilitate guiding the retaining piston 46 within the casing 14, desirably the respective halves 48, 49 of the retaining piston 46 have a groove 60 constructed in the peripheral surface 54 to receive an annular guide bearing 62. The guide bearing 62 is preferably constructed from a composite polymer and is sized to slidably engage the inner surface 26 of the casing 14 to guide the piston rod assembly 12 for axial reciprocation within the casing 14.

Figure 7:
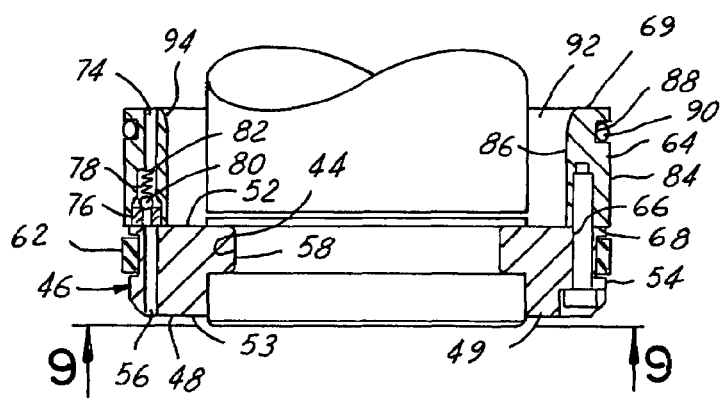
FIG. 7 is a partial sectional view of the piston rod assembly of FIG. 1.

As shown in FIGS. 7 and 9, to facilitate attachment of an annular sleeve 64 to the respective halves 48, 49 of the retaining piston 46, desirably the halves 48, 49 of the retaining piston 46 have at least one and as shown here a pair of through holes 66 extending between their faces 52, 53. The through holes 66 are sized to receive threaded fasteners 70, with the through holes 66 having a counterbore 72 extending into one face 53. The counterbores 72 are sized to receive an enlarged head of each fastener 70, such that the heads of the fasteners 70 are generally flush or recessed relative to the face 53 of the retaining piston 46.

The sleeve 64 is annular, has one face 68 in mating engagement with the face 52 of the retaining piston 46, and another face 69 terminating at a free end. The sleeve 64 has a corresponding number and arrangement of gas ports 74 as in the retaining piston 46, such that when the sleeve 64 is attached to the retaining piston 46, the gas ports 74 in the sleeve 64 are in axial alignment with the gas ports 56 in the retaining piston 46. Accordingly, under certain conditions, as discussed hereafter, gas is generally free to flow through the gas ports 56 in the retaining piston 46 and through the gas ports 74 in the sleeve 64.

Figure 6:
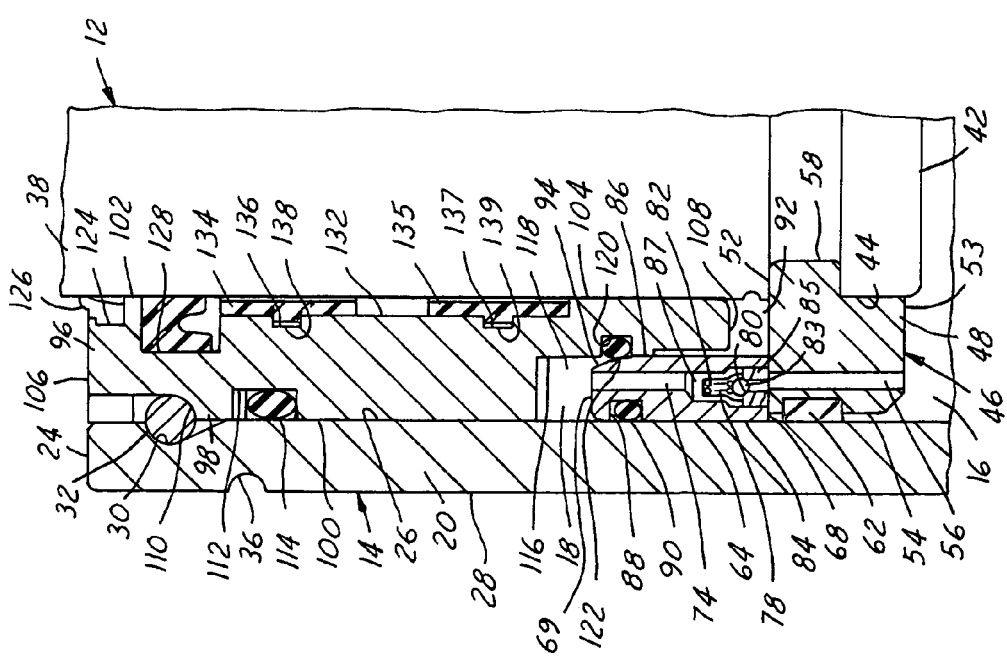
FIG. 6 is a view similar to FIG. 4 with the piston rod assembly in its extended position.

Each gas port 74 in the sleeve 64 generally has an enlarged counterbore 76 open to the face 68 of the sleeve 64 in mating engagement with the retaining piston 46 for receipt of a one-way check valve 78. The check valves 78 selectively permit gas to flow through the gas ports 56 in the retaining piston 46 and the gas ports 74 in the sleeve 64 to permit pressurized gas to flow between the main gas chamber 16 and the secondary gas chamber 18. As best shown in FIGS. 4-6, each check valve includes a valve head 80, such as a spherical ball, that is yieldably biased by a spring 82 to a closed position against a valve seat 83 that may be defined by an insert 85 received in the counterbore 76. To retain the valve head 80 and spring 82, a retainer 87 may be provided in the counterbore 76. In use, particularly during a recharging procedure of the gas spring 10, the gas being introduced into the gas spring 10 through the fill port 34 eventually causes the piston rod assembly 12 to move to its extended position (FIG. 3). As the piston rod assembly 12 moves toward its extended position, the secondary gas chamber 18 is sealed and separated from the main gas chamber 16, as discussed in more detail hereafter. To prevent the gas pressure in the secondary gas chamber 18 from being less than that in the main gas chamber 16, the check valve 78 opens thereby allowing gas to flow through the check valve 78 and into the secondary gas chamber 18 from the main gas chamber 16. As the gas pressure between the secondary gas chamber 18 and the main gas chamber 16 reaches equilibrium, the ball 80 returns to its seated position to close the check valve 78 to gas flow.

The sleeve 64 has an outer surface 84 sized for a close sliding fit relative to the inner surface 26 of the casing 14, and an inner surface 86 spaced radially inwardly from the outer surface 84. To provide a gas-tight seal between the outer surface 84 of the sleeve 64 and the inner surface 26 of the casing 14, desirably the sleeve 64 has a circumferential groove 88 to receive a seal 90, shown here as an O-ring. With the sleeve 64 attached to the retaining piston 46, the sleeve 64 extends axially from the retaining piston 46 and terminates at the free end 69. The inner surface 86 of the sleeve 64 is preferably concentrically arranged with and spaced from the piston rod 38 to define a space 92 between the sleeve 64 and the piston rod 38. Desirably, the inner surface 86 has a flared surface 94 adjacent the free end 69, the function of which is discussed hereafter.

The gas spring 10 has a retainer 96 carried in the casing 14. The retainer 96 has a generally cylindrical wall 98 with an outer surface 100 at least partially sized to be closely received adjacent to the inner surface 26 of the casing 14. The wall 98 has an inner surface 102 defining a through bore 104 in which the piston rod 38 slidably reciprocates. The retainer 96 has generally opposite ends 106, 108, with one end 108 being received in the open end 24 of the casing 14 upon assembly of the retainer 96 in the casing 14. To facilitate attachment of the retainer 96 within the casing 14, desirably the retainer 96 has a generally circumferential groove 110 arranged to receive the snap ring 32 also received in the groove 30 of the casing 14. To further facilitate a gas-tight seal between the retainer 96 and the casing 14, a generally circumferential seal groove 112 is constructed in the outer surface 100 of the retainer 96 for receipt of a seal 114. The seal 114 is shown here as an O-ring compressed between the seal groove 112 and the inner surface 26 of the casing 14.

The outer surface 100 of the retainer 96 has a necked down or reduced diameter portion 116 concentrically arranged with the outer surface 100 and adjacent to the end 108. The reduced diameter portion 116 defines an annular space 118 between it and the casing 14 in which at least a portion of the sleeve 64 is received when the piston rod assembly 12 is in and adjacent to its fully extended position. The necked down portion 116 preferably includes a circumferential seal groove 120 for receipt of a seal 122, represented here as an O-ring. As the inner surface 86 of the sleeve 64 passes over the O-ring 122 (as shown in FIG. 5), the O-ring 122 is at least partially compressed to form a gas tight seal between the sleeve 64 and the retainer 96 during at least a portion of the stroke of the piston rod assembly 12 to seal off the secondary gas chamber 18 from the main gas chamber 16.

The retainer 96 has a circumferential wiper groove 124 adjacent its end 106 for maintaining a wiper 126 therein. The wiper 126 has a lip that engages the piston rod 38 to prevent contamination or debris from entering the gas spring 10 between the retainer 96 and the piston rod 38. The through bore 104 of the retainer 96 has a generally circumferential seal groove 128 spaced axially from the wiper groove 124. The seal groove 128 extends generally radially outwardly from the through bore and is adapted to receive a rod seal 130 that sealingly engages the piston rod 38 to prevent gas from within the gas spring 10 from leaking out of the gas spring 10 between the piston rod 38 and the retainer 96. The retainer 96 preferably has a generally annular recess 132 axially spaced from the seal groove 128 and generally sized to receive a pair of axially spaced apart plain or journal bearings 134, 135, represented here as composite polymer journal bearings. To facilitate maintaining the bearings 134, 135 in their intended locations, a pair of axially spaced, generally circumferential grooves 136, 137 are constructed in the recess 132 to receive radially outwardly extending ribs 138, 139 on the respective bearings 134, 135. It is contemplated that the pair of bearings 134, 135 may incorporate a spacer therebetween, or otherwise could be constructed as a single bearing or more than two bearings (not shown). The increased bearing area presented by the pair of bearings 134, 135 enhances the performance of the gas spring 10 by improving the running alignment of the piston rod assembly 12 within the casing 14. Accordingly, the useful service life and efficiency of the gas spring 10 is increased.

In use, with the piston rod assembly 12 received in the casing 14, and the retainer 96 maintained within the casing 14 by the snap ring 32, the gas spring 10 may be charged with gas through the fill port 34. Accordingly, the gas spring 10 maintains a charge of pressurized gas that yieldably biases the piston rod assembly 12 to its extended position.

Typically, a plurality of charged gas springs 10 are received in a die assembly with a work piece clamp ring or binder ring resting on the ends 40 of the extended piston rods 38. The die assembly is received in a press with one die attached to a bed of the press, while another die is attached to the ram of the press. As the ram is advanced from its fully retracted position, the clamp ring is urged by the gas springs 10 into engagement with a metal blank to be formed. The piston rods 38 of the gas springs 10 are retracted under the ram force as the dies are moved toward their fully closed position to form or stamp the metal blank into a formed part.

The press ram will preferably reach its fully extended position before the piston rod assembly 12 bottoms out on the closed end 22 of the casing 14, thereby preventing damage to the gas spring 10. As shown in FIG. 1, when the piston rod assembly 12 is in its fully retracted position, the main and secondary chambers 16, 18 are in communication with one another so that the gas within the gas spring 10 is generally at a uniform pressure across the retaining piston 46. Accordingly, a single gas chamber is effectively established. This results in large part from the flow of gas between the halves 48, 49 of the retaining piston 46, and as a result of the sleeve 64 being disengaged from the seal 122 in the retainer 96.

As the press ram begins its return stroke, the piston rod assembly 12 moves toward its extended position due to the force of the gas acting on the end 42 of the piston rod 38. As shown in FIG. 5, during the further return stroke of the piston rod assembly 12, the sleeve 64 enters the space 118 between the inner surface 26 of the casing 14 and the necked down portion 116 of the retainer 96. The inner surface 86 of the sleeve 64 comes into mating contact with the seal 122 in the necked down portion 116, and as a result, the secondary gas chamber 18 is established and sealed off from the main gas chamber 16.

The gas spring 10 is preferably constructed such that when the piston rod assembly 12 is in its fully extended position, the secondary gas chamber 18 has its minimum volume, and the pressure of gas in the secondary gas chamber 18 is greater than the pressure of gas in the main gas chamber 16. Preferably, the pressure in the secondary gas chamber 18 is significantly greater than the pressure in the main gas chamber 16, and the gas spring 10 is preferably constructed such that the force of the gas in the secondary gas chamber 18 acting on the sleeve 64 and hence the piston rod assembly 12 is slightly less than the opposing force on the piston rod assembly 12 exerted by the gas in the main gas chamber 16.

Figure 8:
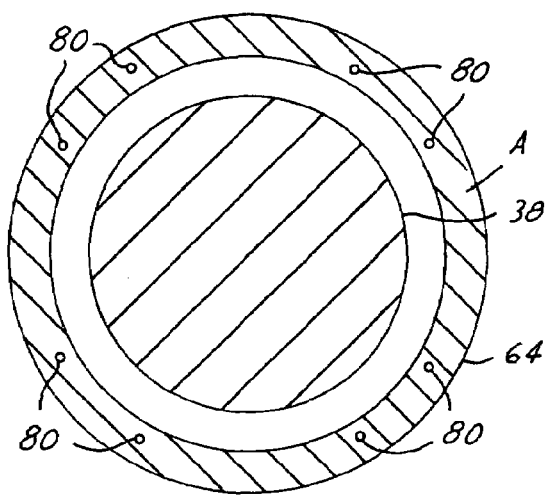
FIG. 8 is a cross sectional view taken through a sleeve and a piston rod of the piston rod assembly of FIG. 1.

This is possible since the gas sealed within the secondary gas chamber 18 acts on a significantly smaller surface area A (FIG. 8) than the gas in the main gas chamber 16. The effective surface area A on which the gas in the secondary gas chamber 18 acts is generally equal to the area of the end face 69 of the sleeve 64. On the other hand, the effective surface area upon which the gas in the main gas chamber 16 acts is generally the area presented by the end 42 of the piston rod 38 and an area of the retaining piston 46 equal to the area of the face 68 of the sleeve 64. Accordingly, a significantly greater pressure of gas is needed in the secondary gas chamber 18 to nearly offset the opposing force acting on the piston rod assembly 12 from the main gas chamber 16 when the rod 38 is in its extended position.

Therefore, the piston rod assembly 12 is biased by a relatively small net force differential to its fully extended position so that the face 52 of the split retaining piston 46 engages the end 108 of the retainer 96 (FIG. 4). When the gas spring 10 is in its fully extended position, the free end 69 of the sleeve 64 is preferably maintained axially spaced from the retainer 96 to maintain a predefined minimum secondary gas chamber volume.

As a result of the relatively small net differential force acting on the piston rod assembly 12 when in its fully extended position, the press ram encounters only a small resistive force from each gas spring 10 when the ram initially engages and displaces each piston rod assembly 12 from its fully extended position toward its retracted position. The reduced or low impact force upon engagement of the press ram with the piston rod 38 reduces the wear, damage, noise and vibration within the gas spring 10 and press assembly. Accordingly, the useful life of the gas spring 10 and press is increased.

Further, with the gas spring 10 construction having the split retaining piston 46 and sleeve 64 generally adjacent the casing 14 throughout the stroke of the piston rod assembly 12, any heat generated within the retaining piston 46 and the sleeve 64 is generally free to dissipate from the gas spring 10 through conduction between the sleeve 64, the retaining piston 46 and the casing 14. Since the outer surface of the sleeve 64 communicates with the inner surface of the casing 14, heat may be transferred from the sleeve to the casing. Additionally, with the secondary gas chamber 18 being formed between the necked down portion 116 and the casing 14, any heat generated in the secondary gas chamber 18 is generally free to dissipate from the gas spring 10 via conductive heat transfer through the casing 14. The reduction in heat within the gas spring 10 tends to lessen the degree of wear on the gas spring component parts, thereby lessening the frequency in which service is required. In addition, the useful life of the gas spring 10 is enhanced and the ability of the press incorporating the gas springs 10 to form repeatable accurate parts is improved.

Additionally, to further improve the performance of the gas spring 10, an increased bearing area is provided over the annular recess 132 in the retainer 96. This is made possible largely by locating the rod seal 130 generally adjacent the end 106 of the retainer 96 and the end 24 of the casing 14. Accordingly, the area of the through bore 104 spaced axially from the rod seal 130 is generally free for the incorporation of the bearings 134, 135. The increase in bearing surface area acting on the piston rod 38 serves to maintain the piston rod 38 in its intended alignment within the retainer 96, thereby enhancing the useful life of the gas spring 10. In addition, by maintaining the piston rod 38 in its intended axial position, the ability to produce repeatable and accurately formed parts is enhanced. Further, by spacing the rod seal 130 from any impact forces, the life of the rod seal 130 is enhanced, thereby enhancing the life of the gas spring 10.

It should be recognized that one of ordinary skill in the art will devise modifications, variations and other embodiments encompassed within the scope of this invention. The embodiments described above are intended to be illustrative and not limiting. The scope of the invention is defined by the claims that follow.

I claim:

1. A gas spring, comprising:
a casing having a circumferentially continuous inner surface defining in part a main gas chamber and a secondary gas chamber;
a piston rod assembly at least partially received in the casing for reciprocation between extended and retracted positions;
a retainer received at least in part in the casing and having a through bore sized to receive at least part of the piston rod assembly as it reciprocates between its retracted position and extended position, an outer surface having a portion disposed generally immediately adjacent to the inner surface of the casing and a reduced diameter portion having an intermediate and circumferentially continuous wall surface between and radially spaced from both the casing inner surface and the bore and generally opposed to and directly facing the casing inner surface, the intermediate wall surface and the casing inner surface being radially spaced apart and directly facing each other throughout their circumferences to each define at least in part the secondary gas chamber; and
the secondary gas chamber opens generally axially onto the main gas chamber when the piston rod assembly is in its retracted position and in cooperation with the piston rod assembly when received in part between the intermediate wall surface and the casing inner surface to separate the secondary gas chamber from the main gas chamber to compress a gas in the secondary gas chamber to act on the piston rod assembly during at least a portion of the movement of the piston rod assembly toward its extended position.

2. The gas spring of claim 1 wherein the piston rod assembly includes a piston rod and an enlarged piston head generally adjacent one end of the piston rod and received in the casing, and a generally annular sleeve extending axially from the piston head, radially spaced from the piston rod, and terminating at a free end sized for receipt in the secondary gas chamber when the piston rod assembly is in its extended position.

3. The gas spring of claim 2 further comprising a seal carried by the reduced diameter portion of the retainer and arranged to engage the sleeve during at least a portion of the piston rod assembly movement between the retracted and extended positions to create a gas tight seal between the retainer and the sleeve.

4. The gas spring of claim 2 further comprising a seal carried by the sleeve and arranged to engage the inner surface of the casing to establish a gas tight seal between the sleeve and the casing.

5. The gas spring of claim 2 wherein the sleeve is attached as a separate piece to the piston head.

6. The gas spring of claim 1 wherein the retainer has a circumferential groove formed in the through bore and adapted to receive a seal for sealing engagement with the piston rod assembly.

7. The gas spring of claim 6 wherein the piston rod assembly has a piston head and the retainer has an annular recess extending axially from the groove to carry a pair of axially spaced bearings between the seal and the piston head.

8. The gas spring of claim 2 wherein the sleeve has an outer surface adjacent to the inner surface of the casing.

9. The gas spring of claim 2 wherein the sleeve has an outer surface in communication with the inner surface of the casing providing conductive heat transfer between the sleeve and the casing.

10. A gas spring, comprising:
a casing defining at least in part a main gas chamber and a secondary gas chamber;
a piston rod assembly at least partially received in the casing for reciprocation between extended and retracted positions and having a piston rod and an annular sleeve;
a retainer for the piston rod assembly carried by the casing and having a through bore, a reduced diameter portion with a wall surface which is circumferentially continuous and generally directly faces the casing, radially spaced from the casing and disposed between the bore and the casing, and the wall surface defines at least in part the secondary gas chamber, the secondary gas chamber opening generally axially onto the main gas chamber when the piston rod assembly is in its retracted position;
a seal carried by the reduced diameter portion of the retainer for engagement by the annular sleeve carried by the piston rod assembly;
the piston rod being sized for reciprocation in the through bore between an extended position and a retracted position; and
the annular sleeve having a free end configured for receipt in the secondary gas chamber between the wall surface and the casing to engage the seal to provide a seal between the retainer and the annular sleeve to separate the secondary gas chamber from the main gas chamber and to compress gas in the secondary gas chamber to act on the piston rod assembly as the piston rod assembly moves toward the extended position.

11. The gas spring of claim 10 further comprising a seal member carried by the sleeve and engaging the casing to provide a gas tight seal between the sleeve and the casing.

12. The gas spring of claim 11 wherein the sleeve has a generally circumferential groove adapted to carry the seal.

13. The gas spring of claim 10 wherein the sleeve has an outer surface disposed adjacent to the inner surface of the casing.

14. The gas spring of claim 10 wherein said reduced diameter portion has a generally circumferential groove adapted to carry the seal.

15. A gas spring, comprising:
a casing defining at least in part a main gas chamber and a secondary gas chamber;
a piston rod assembly received at least in part in the casing, having a rod and an annular portion immediately adjacent the casing, and being movable between an extended position and a retracted position;
a retainer for the piston rod assembly received in the casing and having a reduced diameter portion with a circumferentially continuous wall surface generally opposed to and directly facing the casing and radially spaced from the casing and the rod and between them, the wall surface of the reduced diameter portion of the retainer defining at least in part the secondary gas chamber, and the secondary gas chamber opening generally axially onto the main gas chamber;
at least part of the annular portion of the piston rod assembly being received between the casing and the wall surface of the reduced diameter portion of the retainer when the piston rod assembly is in its extended position; and
the secondary gas chamber being separated and substantially sealed from the main gas chamber to compress a gas in the secondary gas chamber to act on the piston rod assembly during at least a portion of movement of the piston rod assembly to its extended position.

16. The gas spring of claim 15 wherein the piston rod assembly includes an enlarged piston head received in the casing and the annular portion comprises a generally annular sleeve extending axially from the piston head with at least a portion of the sleeve being sized for receipt in the secondary gas chamber between the casing and said at least a portion of the retainer when the piston rod assembly is in its extended position.

17. The gas spring of claim 16 wherein the piston rod assembly includes a piston rod having an outer surface spaced from an inner surface of the sleeve defining a space sized for receipt of said at least a portion of the retainer spaced from the casing when the piston rod assembly is in its extended position.

18. The gas spring of claim 16 wherein the sleeve has generally opposite ends with at least one gas port extending between the ends with a check valve received in said at least one gas port to selectively permit gas flow therethrough.

19. The gas spring of claim 15 wherein at least a portion of the retainer is in substantially mating contact with the casing to define at least in part a gas tight seal between the casing and the retainer.

20. The gas spring of claim 16 further comprising a seal carried by said at least a portion of the retainer and being adapted to engage the sleeve during at least a portion of the piston rod assembly movement between its retracted and extended positions to create when engaged a substantially gas tight seal between the retainer and the sleeve.

21. The gas spring of claim 16 further comprising a seal carried by the sleeve and arranged to engage the casing to establish a substantially gas tight seal between the sleeve and the casing.

* * * * *